US006952513B2

(12) United States Patent
Murphy et al.

(10) Patent No.: US 6,952,513 B2
(45) Date of Patent: Oct. 4, 2005

(54) METHOD AND APPARATUS FOR EFFECTING ALIGNMENT IN AN OPTICAL APPARATUS (75) Inventors: Daniel J. Murphy, Allen, TX (US); Robert B. Chipper, Allen, TX (US); Brent L. Sisney, Allen, TX (US); David H. Rester, Dallas, TX (US); James T. Hoggins, Plano, TX (US); James J. Hudgens, Plano, TX (US)

(73) Assignee: Raytheon Company, Lexington, MA (US)

( * ) Notice: Subject to any disclaimer, the term of this patent is extended or adjusted under 35 U.S.C. 154(b) by 51 days.

(21) Appl. No.: 10/636,453

(22) Filed: Aug. 6, 2003

(65) Prior Publication Data

US 2004/0028339 A1 Feb. 12, 2004

Related U.S. Application Data

(63) Continuation of application No. 09/823,606, filed on Mar. 30, 2001, now Pat. No. 6,768,844.

(51) Int. Cl.⁷ .................................................. G02B 6/26
(52) U.S. Cl. ............................ 385/52; 385/33; 385/31
(58) Field of Search ................................ 385/52, 14, 5, 385/13, 15, 25, 31, 33

(56) References Cited

U.S. PATENT DOCUMENTS

| | | | |
|---|---|---|---|
| 3,872,246 A | | 3/1975 | Schneider |
| 4,291,941 A | | 9/1981 | Melzer |
| 4,358,851 A | | 11/1982 | Scifres et al. |
| 4,701,011 A | | 10/1987 | Emkey et al. |
| 4,868,361 A | * | 9/1989 | Chande et al. ......... 219/121.62 |
| 5,009,482 A | | 4/1991 | Lincoln |
| 5,054,877 A | * | 10/1991 | Ortiz, Jr. et al. .............. 385/33 |
| 5,293,438 A | | 3/1994 | Konno et al. |
| 5,336,899 A | | 8/1994 | Nettleton et al. |
| 5,343,546 A | * | 8/1994 | Cronin et al. .................. 385/52 |
| 5,477,323 A | | 12/1995 | Andrews et al. |
| 6,033,515 A | | 3/2000 | Walters et al. |
| 6,275,630 B1 | | 8/2001 | Yang et al. |
| 6,280,100 B1 | * | 8/2001 | Haake .......................... 385/73 |
| 6,301,407 B1 | * | 10/2001 | Donaldson .................... 385/34 |
| 6,316,764 B2 | | 11/2001 | Heffner et al. |
| 6,349,160 B2 | | 2/2002 | Tsien et al. |
| 6,360,039 B1 | | 3/2002 | Bernard et al. |
| 6,445,858 B1 | | 9/2002 | Musk |
| 6,463,196 B2 | | 10/2002 | Shekel et al. |
| 2001/0014198 A1 | | 8/2001 | Walters et al. |

FOREIGN PATENT DOCUMENTS

| | | |
|---|---|---|
| DE | 39 03 196 A1 | 8/1990 |
| DE | 199 27 167 A1 | 11/2000 |
| EP | 1 014 125 A2 | 6/2000 |
| JP | 59-055407 | 3/1984 |
| JP | 62-168103 | 7/1987 |

OTHER PUBLICATIONS

Text and drawings of U.S. Appl. No. 10/405,807 filed Apr. 1, 2003 by inventor Brent L. Sisney for "Method and Apparatus For Separating or Combining Optical Signals Using a Dispersive Element".

* cited by examiner

Primary Examiner—Frank G. Font
Assistant Examiner—Kianni C. Kaveh
(74) Attorney, Agent, or Firm—Baker Botts L.L.P.

(57) ABSTRACT

An optical apparatus (110) includes a base member (121) with a plurality of grooves (181–187, 191–197), and includes a respective lens (11–17) fixedly mounted in each groove. Optical filters (31–35) are mounted on the support member in predetermined locations. One such lens is fixedly secured to an input optical fiber (21), and the input fiber is used to introduce radiation into the apparatus. Several output optical fibers (22–27) are successively positioned in relation to respective lenses by a fiber positioner (302), which monitors the amount of radiation passing through the fiber being positioned, and then causes a laser (303) to fuse the fiber end to the associated lens in a selected position.

8 Claims, 5 Drawing Sheets

METHOD AND APPARATUS FOR EFFECTING ALIGNMENT IN AN OPTICAL APPARATUS

This application is a continuation of U.S. Ser. No. 09/823,606 filed on Mar. 30, 2001 now U.S. Pat. No. 6,768,844.

TECHNICAL FIELD OF THE INVENTION

This invention relates in general to optical devices and, more particularly, to alignment of optical fibers relative to other components in such optical devices.

BACKGROUND OF THE INVENTION

One existing type of optical device is an optical add/drop multiplexer (OADM), which has several collimating lenses and several filters, and which has an input fiber and several output fibers that are each physically coupled to a respective collimating lens. Optical radiation is supplied to the OADM through the input fiber and its associated lens, and impinges on the first of the filters, which reflects a portion of the radiation and passes a further portion of the radiation to a lens associated with one of the output fibers. The reflected portion of the radiation travels to another of the filters, which reflects a portion of that radiation and passes another portion of it to another lens associated with another output fiber. This sequence may continue for several more filters, lenses and output fibers.

In a known approach for manufacturing an optical device of this type, each output fiber is physically and optically coupled to its associated lens before the lenses are installed into a support arrangement which maintains them in an operational configuration. As a practical matter, the filters used in these devices are not ideal. For example, the filters may have surfaces on opposite sides thereof which are not parallel, and which thus produce a small amount of refraction in the radiation which passes therethrough. Due to this refraction, radiation which has passed through the filter travels away from it along a path which has a small angle with respect to the path that this radiation would have followed if the filter conformed to ideal characteristics.

In order to compensate for the refraction of this radiation, various techniques are used to permit independent adjustment of the lenses for each of the output fibers relative to the member which supports them, so that each such lens accurately focuses radiation on an end of the output fiber associated with it. In general, this approach involves the need for four degrees of freedom in the positioning of each such lens, including linear movement parallel to each of two translational axes that are normal to each other and to the optical axis of the collimating lens, and also pivotal movement about these two translational axes. These four degrees of freedom make accurate alignment relatively difficult, especially since collimating lenses are often more sensitive to rotational movement than to linear movement by a factor of approximately 3. Moreover, once alignment is obtained, it may be difficult to maintain it through environmental conditions such as vibration and temperature changes. Another consideration is the fact that this traditional approach involves a significant amount of manual labor and is thus expensive and time consuming in a production environment.

SUMMARY OF THE INVENTION

From the foregoing, it may be appreciated that a need has arisen for a technique for effecting alignment of optical parts in an optical apparatus. According to the present invention, a technique is provided to address this need, and involves: fixedly mounting first and second optical elements in respective predetermined operational positions on a support member; transmitting radiation along an optical path so that the radiation is optically influenced by the first optical element, thereafter reaches and is optically influenced by the second optical element, and thereafter reaches an end portion of an optical fiber; adjusting a position of the end portion with respect to the second optical element while monitoring the amount of radiation from the optical path which enters the end portion, until the end portion is disposed in a selected position with respect to the second optical element; and thereafter fixing the end portion in the selected position with respect to the second optical element.

BRIEF DESCRIPTION OF THE DRAWINGS

A better understanding of present invention will be realized from the detailed description which follows, taken in conjunction with the accompanying drawings, in which.

DETAILED DESCRIPTION OF THE INVENTION

Figure 1:
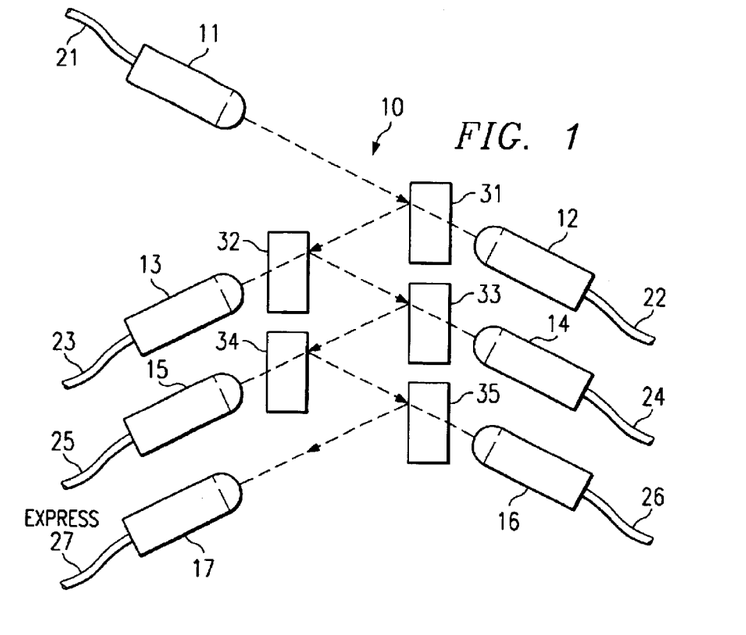
FIG. 1 is a diagrammatic view of an optical add/drop multiplexer which is part of an apparatus that is made in accord with the present invention.

FIG. 1 is diagrammatic view of an optical add/drop multiplexer (OADM) 10, which is described in more detail later, and which is part of an apparatus made in accord with the present invention. The OADM 10 is discussed herein in a configuration in which it functions as a drop multiplexer, but it will be recognized from the following discussion that it can alternatively function as an add multiplexer without any structural changes by simply using the input as an output and each output as an input.

The OADM 10 includes seven collimating lenses 11–17. In the disclosed embodiment, each of the lenses 11–17 is an approximately cylindrical optical element made of fused silica with a uniform composition. At the outer end of each lens 11–17 in FIG. 1, there is a substantially flat end surface. Each of the lenses 11–17 has a curved surface at the inner end thereof in FIG. 1, the curvature of these surfaces being exaggerated in FIG. 1 so as to be clearly visible and thus facilitate an understanding of the present invention. The lenses 11–17 are of a type which is commercially available and which is known to persons skilled in the art, and thus the lenses 11–17 are not described here in further detail. One suitable lens is available as part number FSL4.438-1.250B3 from Light Path Technologies of Albuquerque, N. Mex.

As just discussed, the collimating lenses in the embodiment of FIG. 1 are of uniform composition and have a curved surface at one end that effects focusing of radiation entering the lens. However, it will be recognized that they could alternatively be some other suitable type of lens, for example a lens of the type commonly known as a gradient index (GRIN) lens, which has approximately flat surfaces at each end and which has a non-uniform composition with a varying index of refraction that effects focusing of radiation entering the lens.

Seven optical fibers 21–27 each have an end portion which is disposed against and fixedly secured with respect to the flat outer end surface of a respective one of the lenses 11–17. In the disclosed embodiment, the fibers 21–27 are each a single mode fiber of a type known to persons skilled in the art. One suitable fiber is available as part number SMF-28 from Corning Incorporated of Corning, N.Y. Each fiber has a cylindrical core, a cladding which concentrically surrounds the core, and an acrylate coating which concentrically surrounds the cladding.

The OADM 10 of FIG. 1 further includes five filters 31–35. In the disclosed embodiment, the filters 31–35 are each an International Telecommunications Union (ITU) grid filter of a known type. For example, suitable filters are available as part number 1668290 from ELCAN Optical Technologies of Midland, Ontario, Canada, which is part of Raytheon Company of Lexington, Mass. Each of the filters 31–35 is transmissive to radiation having a frequency within a selected passband, and is substantially reflective to radiation outside that passband. Each of the filters 31–35 has a passband with a different range of frequencies.

The apparatus 10 of FIG. 1 operates in the following manner. Optical fiber 21 serves as an input fiber which carries an optical input signal that is a composite of several different optical signals at respective different frequencies. Optical fibers 22–27 each serve as a respective output fiber. An input signal traveling through the input fiber 21 passes from the fiber 21 into the associated lens 11, and then travels toward the filter 31 after exiting the lens 11, as shown diagrammatically by a broken line in FIG. 1.

At the filter 31, radiation outside the passband of the filter 31 is reflected toward the filter 32, and radiation within the passband of the filter 31 propagates through the filter 31 to the lens 12. The radiation which passes through the filter 31 to the lens 12 represents one of the various optical signals that are present in the composite input signal on fiber 21. The curved surface at the left end of the lens 12 focuses the radiation from the filter 31 toward the opposite end of fiber 22. In the disclosed embodiment, the focal point of the curved surface is located approximately on the flat surface of the lens 12. From the lens 12, the radiation enters the fiber 22, and passes out of the OADM 10.

With reference to the radiation reflected by filter 31 toward filter 32, a portion of the reflected radiation within the passband of the filter 32 passes through the filter 32 and then travels to the lens 13 associated with the output fiber 23. This radiation is handled by the lens 13 in a manner similar to that described above for the lens 12. With respect to the portion of the radiation which reaches filter 32 but is outside the passband of filter 32, this portion of the radiation is reflected by the filter 32 toward the filter 33. At each of the remaining filters 33, 34 and 35, a respective portion of the radiation reaching the filter passes through that filter to a respective one of the lenses 14–16, where it is focused by the curved end of the lens toward the flat end of the lens, and then passes into a respective one of the output fibers 24–26. Also, at each such filter, a portion of the radiation is reflected because it is outside the passband of the filter. As a result, each of the output fibers 22–26 carries a respective one of five different optical signals that are each a component part of the composite input signal received through the input fiber 21.

With respect to the radiation reflected by filter 35, it will be noted that all of this radiation travels directly to the fiber 27 without passing through any further filter. Thus, this portion of the optical radiation includes all remaining component signals from the composite input signal on fiber 21. This may be one component signal, or several component signals. The output represented by lens 17 and fiber 27 is sometimes referred to as an "express" output.

Figure 2:
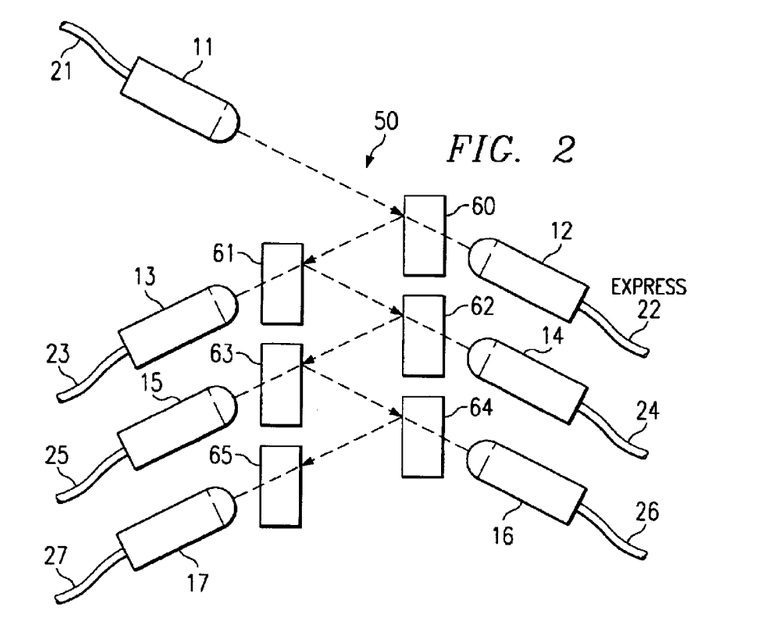
FIG. 2 is a diagrammatic view of an alternative embodiment of the multiplexer of FIG. 1.

FIG. 2 is a diagrammatic view of an OADM 50 which is an alternative embodiment of the OADM 10 of FIG. 1. The OADM 50 includes collimating lenses 11–17 and associated optical fibers 21–27 which are equivalent to those described above in association with the embodiment of FIG. 1. Further, the OADM 50 includes six filters 60–65. The five filters 61–65 are grid filters equivalent in structure and function to the filters 31–35 of FIG. 1. The filter 60 is slightly different, and is referred to as an band select filter. In particular, the band select filter 60 has a wider passband than each of the filters 61–65, so that radiation which passes through the band select filter 60 to the lens 12 will typically include several of the component signals that are present in the input signal received through the input fiber 21. Thus, in the embodiment of FIG. 2, the optical fiber 22 is the express output that can extract several of the component optical signals from the composite optical input signal on input fiber 21, whereas optical fibers 23–27 are the regular outputs which each extract a single component signal from the composite optical input signal.

The term "insertion loss" is commonly used in the industry to refer to a value which is the logarithm of the ratio of the wattage of an optical signal on a given output fiber 22–27 relative to the wattage of the same optical signal on the input fiber 21. In FIGS. 1 and 2, each of the filters 31–35 and 60–65 tends to add an incremental degree of insertion loss to optical radiation which passes through it or which is reflected by it. According to one known criteria, the insertion loss should not exceed 1.8 dB from the input fiber (at 21 in each of FIGS. 1 and 2) to the express output fiber (at 27 in FIG. 1, and at 22 in FIG. 2). According to a related criteria, the insertion loss should not exceed 5.5 dB from the input fiber (at 21 in FIGS. 1 and 2) to any one of the regular output fibers (at 22–26 in FIG. 1, and at 23–27 in FIG. 2). In other words, the insertion loss to the express output fiber must meet a significantly stricter standard than the insertion loss to any of the regular output fibers.

With this in mind, it will be noted that OADM 50 of FIG. 2 extracts the express output with the interposition of only a single filter 60, and thereafter extracts the regular outputs. This makes it easier to satisfy the industry standard for the insertion loss at the express output. However, the OADM 50 of FIG. 2 needs six filters, and is thus more expensive to manufacture than the OADM 10 of FIG. 1, which needs only five filters 31–35. But in the OADM 10 of FIG. 1, all five filters 31–35 are interposed in series between the input fiber 21 and the express output fiber 27. Consequently, in FIG. 1, each of the filters 31–35 contributes to an incremental increase in the insertion loss of optical radiation traveling from the input fiber 21 to the express output fiber 27. This makes it more difficult to satisfy the industry standard for the insertion loss at the express output. The embodiment of FIG. 1 thus presents a greater design challenge, in comparison to the embodiment of FIG. 2, with respect to the goal of keeping the insertion loss for the express output fiber to a level below 1.8 dB. Although the present invention is fully compatible with implementation of the OADM 50 of FIG. 2, an advantage of the present invention is that it also facilitates implementation of the OADM 10 shown in FIG. 1 in an efficient and economical manner.

Although the OADM 10 of FIG. 1 and the OADM 50 of FIG. 2 are each configured to have six output fibers, it will be recognized that each can be readily reconfigured to have a larger or smaller number of output fibers. In addition, even though the lenses 11–17 used in each of these embodiments are implemented with a single element made from fused silica with a uniform composition, it will be recognized that each could alternatively utilize some other lens configuration, including but limited to a lens system having two or more separate lenses.

Figure 3:
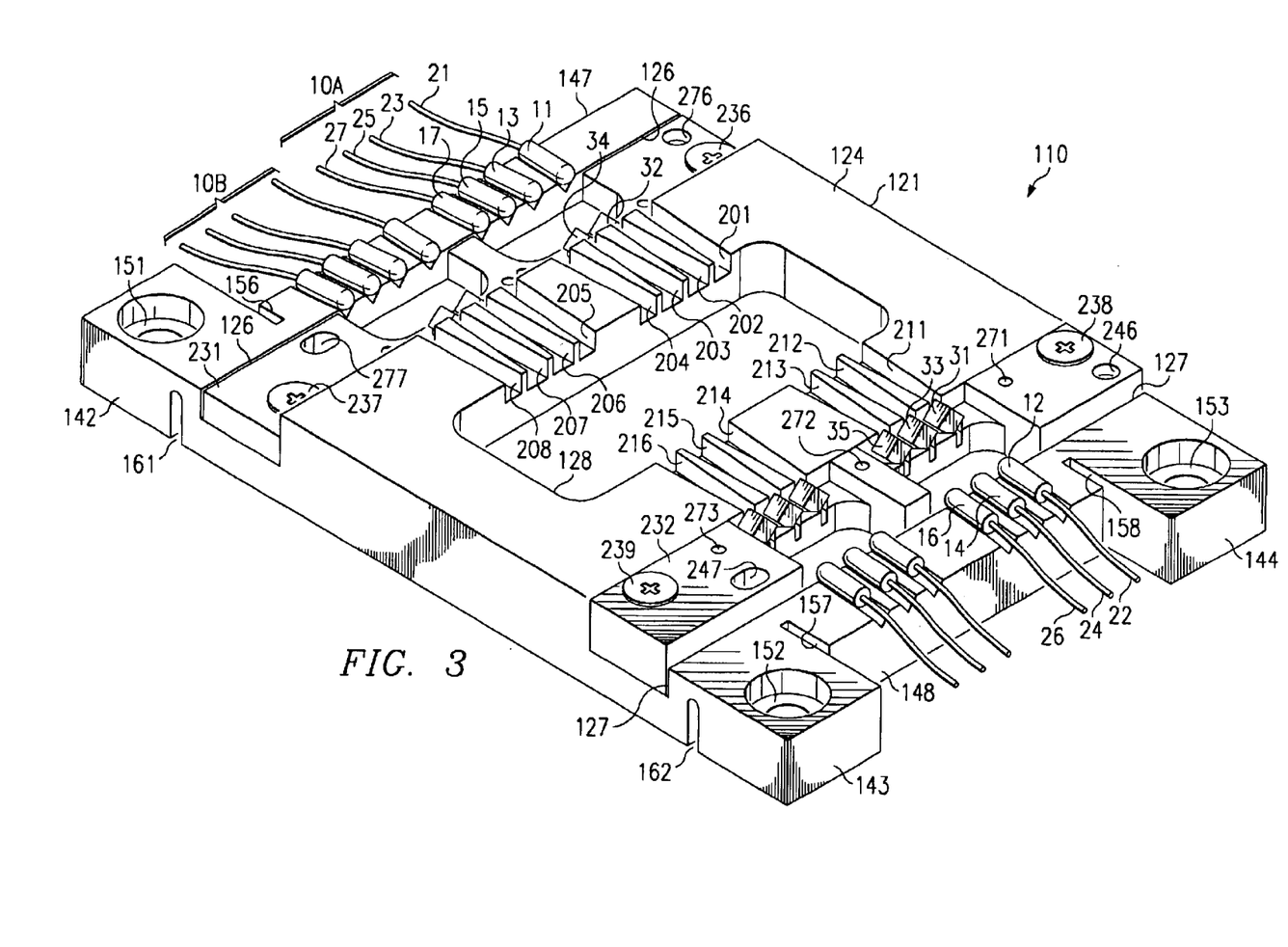
FIG. 3 is a diagrammatic perspective view of an optical add/drop multiplexer apparatus which is made in accord with the present invention, and which includes the multiplexer of FIG. 1.
Figure 4:
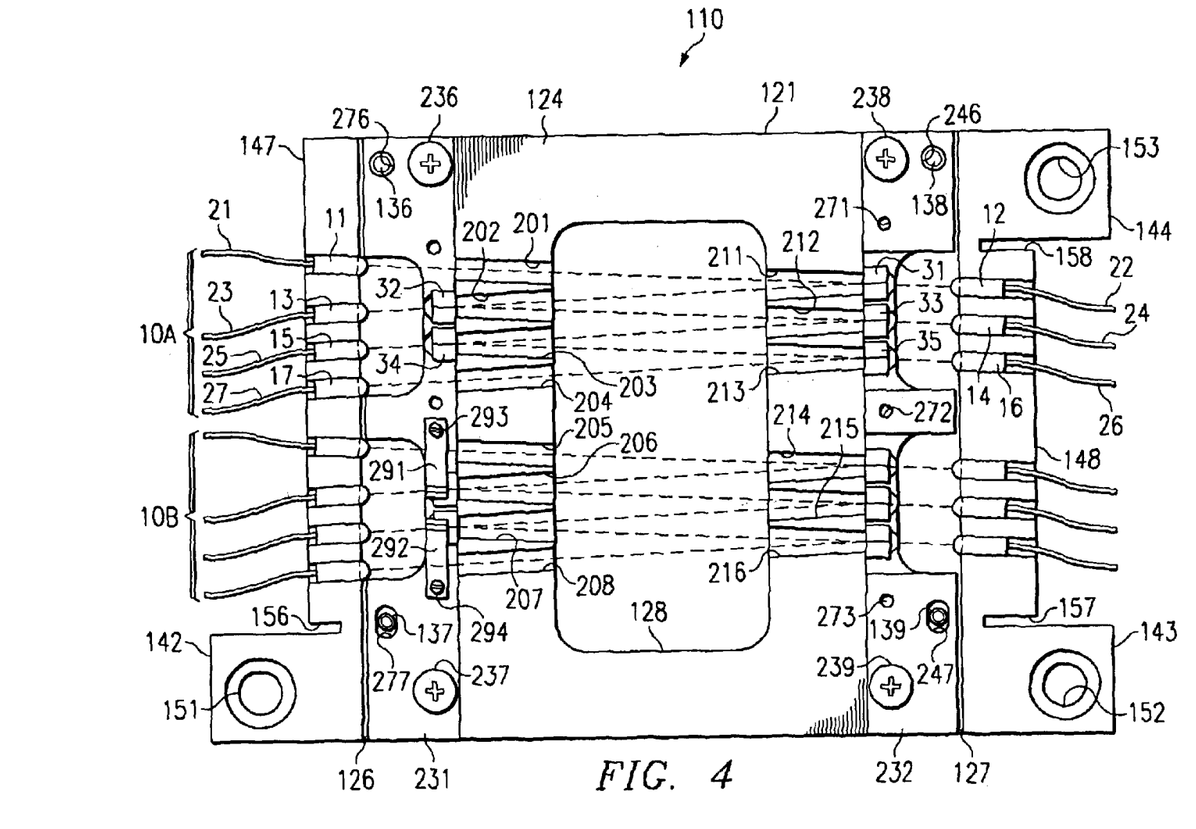
FIG. 4 is a diagrammatic top view of the multiplexer apparatus of FIG. 3.

FIG. 3 is a diagrammatic perspective view of an OADM apparatus 110 which is made in accord with the present invention. FIG. 4 is a diagrammatic top view of the OADM apparatus 110. As discussed in more detail later, the OADM apparatus 110 includes several leaf springs, but all of these leaf springs have been omitted in FIG. 3 for clarity, and all but two have been omitted in FIG. 4 for clarity.

The OADM apparatus 110 of FIGS. 3 and 4 includes two instances of the OADM 10 discussed above in association with FIG. 1, one of which is designated generally by reference numeral 10A, and the other of which is designated generally by reference numeral 10B. The respective components of the OADM 10A are identified with the same reference numerals used to identify them in FIG. 1, including the collimating lenses 11–17, the optical fibers 21–27, and the filters 31–35. The equivalent component parts of the OADM 10B do not have reference numerals in FIG. 3.

Figure 5:
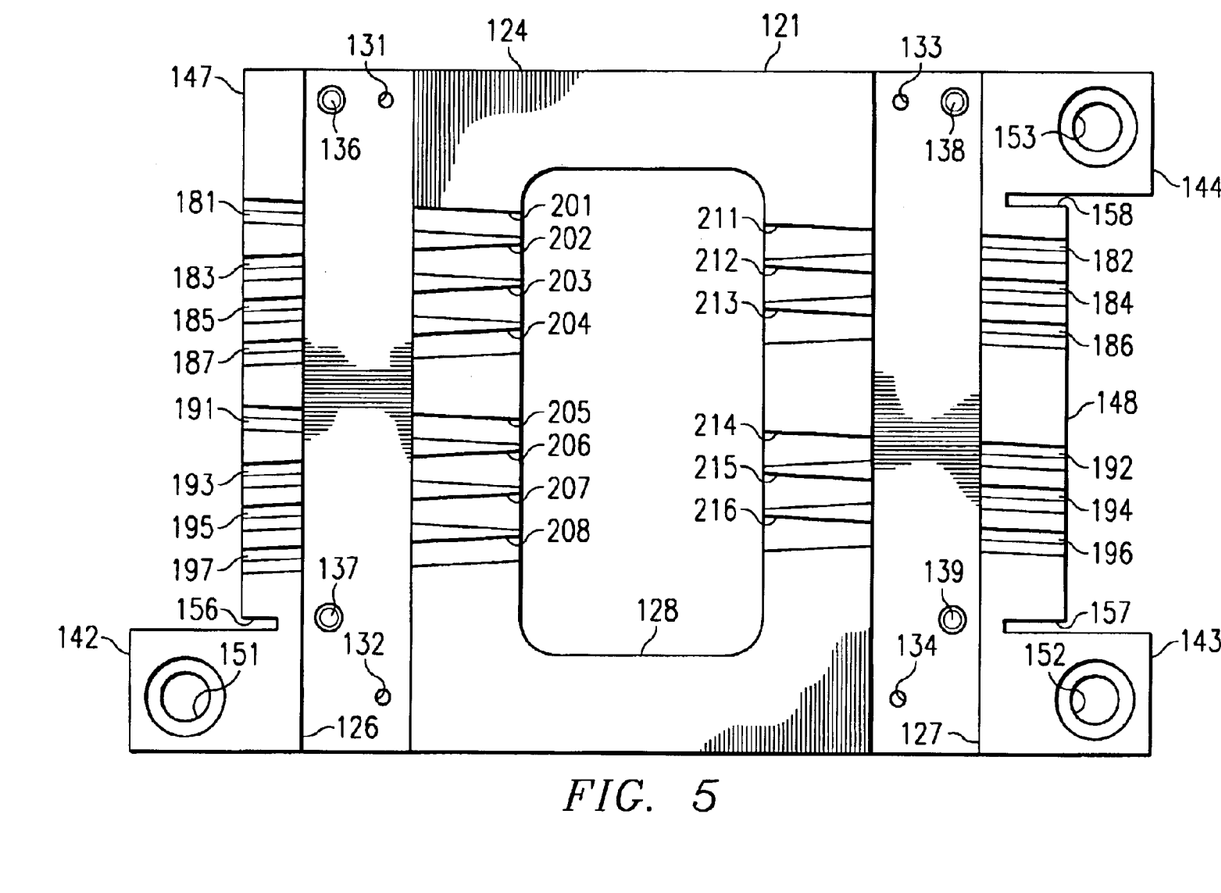
FIG. 5 is a diagrammatic top view of a base member which is a component of the multiplexer apparatus of FIG. 3.

The OADM apparatus 110 includes a base member 121 which serves as a support member, and which may also be referred to as a V-block. FIG. 5 is a diagrammatic top view similar to FIG. 4, but showing only the base member 121 by itself. With reference to FIGS. 3–5, the base member 121 is a metal plate which, in the disclosed embodiment, is made of aluminum. The base member 121 has parallel top and bottom surfaces, and the top surface is designated by reference numeral 124. The base member 121 has spaced, parallel grooves 126 and 127 provided in the top surface 124 thereof, the grooves 126–127 each being of rectangular cross section and extending transversely across the base member 121. Between the grooves 126–127, the base member 121 has a central opening 128 which extends vertically through it, the opening 128 being of approximately rectangular shape, and being oriented so that the long sides thereof extend parallel to the grooves 126–127.

Two threaded openings 131–132 each extend downwardly into the base member 121 from the bottom surface of the groove 126, the openings 131 and 132 each being located near a respective end of the groove 126. Similarly, two threaded openings 133–134 each extend downwardly into the base member 121 from the bottom surface of the groove 127, the openings 133 and 134 each being located near a respective end of the groove 127.

Two cylindrical posts 136–137 project upwardly from the bottom surface of groove 126, the post 136 being located near one end of the groove 126, and the other post 137 being spaced inwardly a short distance from the opposite end of the groove 126. Similarly, two cylindrical posts 138–139 project upwardly from the bottom surface of the groove 127, the post 138 being located near one end of the groove 127, and the other post 139 being spaced inwardly a short distance from the opposite end of the groove 127.

The base member 121 has, at three corners thereof, respective tabs 142–144. The tab 142 projects outwardly past one end surface 147 of the base member 121, and the tabs 143–144 each project outwardly past an opposite end surface 148 of the base member 121. The tabs 142–144 have respective vertical cylindrical holes 151–153 extending therethrough, the holes 151–153 each being counterbored at the upper end thereof.

Figure 6:
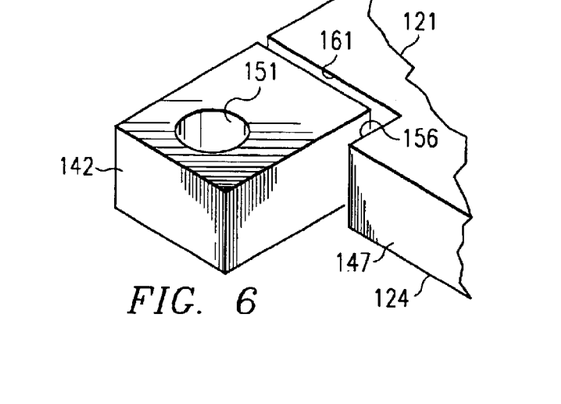
FIG. 6 is a diagrammatic fragmentary perspective view of a portion of the base member of FIG. 5, with the base member turned upside down.

A vertical slot 156 extends into the base member 121 from the end surface 147 at a location adjacent the tab 142. Similar vertical slots 157–158 extend into the base member 121 from the opposite end surface 148 thereof, and are respectively located adjacent to the tabs 143 and 144. FIG. 6 is a fragmentary diagrammatic perspective view of the corner portion of the base member 121 which includes the tab 142, with the base member 121 turned upside down. With reference to FIGS. 3 and 6, a further slot 161 extends vertically upwardly into the tab 142 from the bottom surface of the base member 121, and extends transversely across the tab 142 so that one end of the slot 161 intersects an inner end of the slot 156. The tabs 143 and 144 each have a slot which is similar to the slot 161, one of which is visible at 162 in FIG. 3.

With reference to FIG. 5, the base member 121 has in the top surface 124 thereof eight V-shaped grooves 181, 183, 185, 187, 191, 193, 195 and 197, which each extend between the end surface 147 and a side surface of the groove 126. Further, the base member 121 has in the top surface 124 six additional V-shaped grooves 182, 184, 186, 192, 194 and 196, which each extend between the end surface 148 and a side surface of the groove 127.

With reference to FIGS. 3–5, the base member 121 has in its top surface 124 eight additional grooves 201–208 which each extend between a side surface of the groove 126 and a side surface of the central opening 128. Further, the base member 121 has in its top surface 124 six further grooves 211–216, which each extend from a side surface of the groove 127 to a side surface of the central opening 128. The grooves 201–208 and 211–216 each have a uniform depth, and are of rectangular cross section at all locations along the length thereof. The grooves 201, 204, 205 and 208 each have a width which is constant along the entire length thereof, whereas grooves 202–203, 206–207 and 211–216 each taper progressively in width in a direction away from the central opening 128.

In manufacturing the base member 121 of FIG. 5, the entire upper surface of the base member 121 is machined to have approximately the configuration which is shown in FIG. 5. Then, the entire upper surface is subjected to a very precise machining using the well-known technique of diamond point turning (DPT), so that the entire upper surface conforms to very precise tolerances, especially as to the position and orientation of the V-shaped grooves 181–187 and 191–197 with respect to each other.

Although the disclosed base member 121 has an upper surface which is formed by a technique which includes diamond point turning, it will be recognized that there are other known techniques which could be used to facilitate fabrication of the base member 121. For example, instead of effecting diamond point turning of the upper surface of the base member 121, the upper surface could be formed through a precision grinding process. As another example, the entire base member 121, including the upper surface thereof, could be formed to precise tolerances through use of a precision injection molding technique.

As shown in FIGS. 3 and 4, the OADM apparatus 110 includes two filter trays 231 and 232, which are machined from metal and are each disposed in a respective one of the grooves 126 and 127. The filter tray 231 is fixedly secured in place within the groove 126 by two screws 236 and 237, which threadedly engage the respective threaded holes 131–132 (FIG. 5) provided in the base member 121. The filter tray 232 is held in place within the groove 127 by two screws 238–239 which threadedly engage the respective threaded holes 133–134 (FIG. 5) provided in the base member 121.

Figure 7:
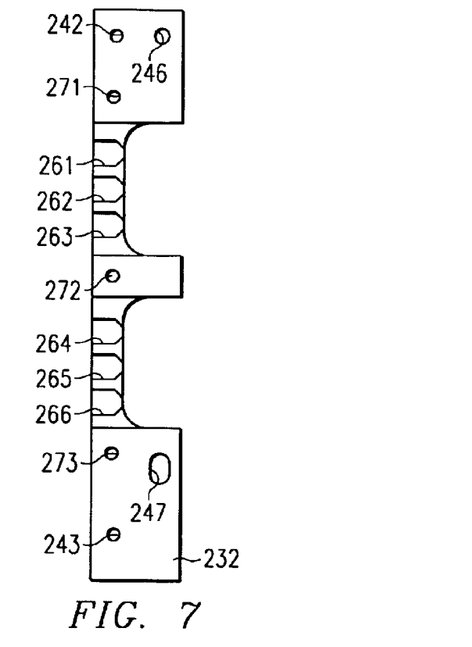
FIG. 7 is a diagrammatic top view of a filter tray which is a component of the multiplexer apparatus of FIG. 3.

FIG. 7 is a diagrammatic top view of the filter tray 232. Filter tray 232 has two holes 242–243 which extend vertically through it near respective ends thereof. The screws 238–239 (FIGS. 3–4) each have a shank which is rotatably received in a respective one of the holes 242–243 without threaded engagement therewith.

The filter tray 232 has adjacent the hole 242 a further cylindrical hole 246, which axially slidably receives the post 138 (FIG. 4). The filter tray 232 has, at a location spaced inwardly from the opposite end, a short slot 247 which extends vertically therethrough and extends lengthwise thereof, the slot 247 slidably receiving the post 139 (FIG. 4). The posts 138–139 and the cooperating hole 246 and slot 247 help ensure that the filter tray 232 is installed only in the groove 127 and not the groove 126, and help ensure that the filter tray 232 can only be installed with the proper orientation. Filter tray 232 receives the post 139 in the slot 247, rather than in a cylindrical opening, in order to reduce certain manufacturing tolerances for the filter tray 232.

With reference to FIG. 7, the filter tray 232 has six filter support grooves 261–266 provided in upwardly facing surfaces thereof. The grooves 261–266 each extend transversely across a narrow portion of the filter tray 232. The grooves 261–266 are of uniform depth, and each groove has a rectangular cross section at all locations along the length thereof. Beginning at the left end of the grooves 261–266 in FIG. 7, and moving toward the right end, each has a first portion of constant width, and then a second portion which tapers progressively in width.

With reference to FIGS. 3–4 and 7, the filter tray 232 has three spaced cylindrical holes 271–273 which each extend vertically downwardly from the top surface thereof. The holes 271–273 are used to secure not-illustrated leaf springs to the filter tray 232, in a manner and for a purpose discussed later.

The filter tray 231 is almost a mirror image of the filter tray 232, except that the filter tray 231 has only four filter support grooves, whereas the filter tray 232 has the six filter support grooves 261–266 discussed above. As best seen in FIG. 4, the filter tray 231 has a cylindrical hole 276 which receives the post 136, and has a slot 277 which receives the post 137.

Figure 8:
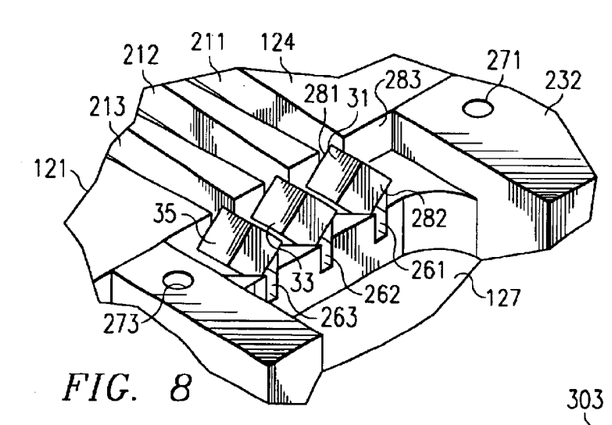
FIG. 8 is a diagrammatic fragmentary perspective view showing a portion of the multiplexer apparatus of FIG. 3 in an enlarged scale.

FIG. 8 is a diagrammatic fragmentary perspective view which shows a portion of FIG. 3 in an enlarged scale. With reference to FIGS. 4 and 7–8, it will be noted that the filter support grooves 261–263 of the filter tray 232 each receive and support a respective one of the filters 31, 33 and 35. As best seen in FIG. 8, the filters 31, 33 and 35 each have approximately the shape of cube. Focusing on the filter 31, there are surfaces 281 and 282 on opposite thereof. The filter 31 is oriented so that the surfaces 281 and 282 are approximately vertical, and so that the other four surfaces each extend at an angle of approximately 45° with respect to horizontal and vertical references. A lower portion of the filter 31 extends down into the groove 261, and two of the side edges of the surface 282 engage upper edges of the tapering walls of the groove 261. A not-illustrated leaf spring engages the top of the filter 31, and resiliently urges the filter 31 downwardly into the groove 261.

Due to the engagement of the edges of the filter 31 with the edges of the tapering sides of the groove 261, in combination with the downward urging of the not-illustrated leaf spring, the filter 31 is urged to move in a direction toward the side surface 283 of the groove 127, so that the surface 281 of the filter 31 is pressed firmly against the side surface 283. When radiation traveling through the groove 211 of the base member 121 reaches the filter 31, a portion of that radiation is reflected by the filter 31 so that it travels back through the groove 211, while a different portion of the radiation passes through the filter 31 from the surface 281 to the surface 282 thereof. With reference to FIGS. 3–4 and 7, each of the filter support grooves of the filter trays 231–232 supports a respective filter in a manner similar to that just described for the filter 31 and the groove 261 in filter tray 232.

FIG. 4 shows two metal leaf springs 291 and 292 which are each fixedly secured at one end to the filter tray 231 by a respective screw 293 or 294. Each of the leaf springs 291–292 could alternatively be secured to the filter tray 231 in some other manner, for example by a spot weld. The opposite end of each leaf spring engages a respective filter and resiliently urges the filter downwardly toward the filter tray 231. The spring thus causes the associated filter to be securely held in place, and also causes the filter to be urged firmly against a side surface of the groove 126 through cooperation between edges of the filter and edges of the filter support groove, so as to ensure accurate orientation of the filter.

Referring again to FIG. 8, the surfaces 281 and 282 on opposite sides of the filter 31 should ideally be parallel. However, manufacturing tolerances are such that commercially available components suitable for use as the filter 31 have side surfaces 281 and 282 that are often not completely parallel. Consequently, as radiation travels through the filter 31 from the surface 281 to the surface 282, the filter 31 will have a tendency to effect a small amount of refraction of the radiation, such that radiation exiting the filter 31 travels away from the filter 31 at a slightly different angle than it would travel if the surfaces 281 and 282 were truly parallel. The present invention provides compensation for this refraction, in a manner which will be discussed later.

Based on a comparison of FIGS. 4 and 5, it will be noted that the collimating lenses 11–17 of the OADM 10A are each received in a respective one of the V-shaped grooves 181–187 in the base member 121. Similarly, the collimating lenses of the OADM 10B are each received in a respective one of the V-shaped grooves 191–197 in the base member 121. The collimating lenses are each fixedly held in the associated V-shaped groove, for example by a suitable adhesive of a known type, or by a leaf spring similar to that shown at 291 in FIG. 4. As discussed above, the V-shaped grooves 181–187 and 191–197 are accurately defined during fabrication of the base member 121 through use of a diamond point turning (DPT) machining process. As a result, they have a very precise alignment with respect to each other. The V-shaped grooves 181–187 and 191–197 thus effect a very precise relative alignment of the collimating lenses 181–187 and 191–197 which are disposed therein.

Prior to assembly of the OADM apparatus 110 of FIG. 3, the input fiber 21 of the OADM 10A is accurately secured to the associated collimating lens 11 using a jig of a type which is well known in the art, and which is therefore neither described nor illustrated here in detail. In essence, this jig accurately positions the end of the fiber 21 in the exact center of the flat circular end surface of the lens 11, and then fixedly secures it there, through use of an appropriate adhesive, or by fusing the material of the fiber 21 to the lens 11 with a laser beam. In a similar manner, the jig is used to position and secure the input fiber of the OADM 10B to its collimating lens. According to a feature of the invention, the output fibers 22–27 of the OADM 10A are not secured to their associated lenses 12–17 prior to installation of the lenses 12–17 into the OADM apparatus 110. Similarly, the equivalent output fibers and associated lenses of the OADM 10B are not secured together in advance of assembly.

Assembly of the OADM apparatus 110 is carried out as follows. The filter trays 231–232 are each properly positioned in a respective groove 126–127 of the base member 121, and are then secured in place using the screws 236–239. Then, the filters 31–35 of the OADM 10A and the equivalent filters of the OADM 10B are respectively placed into the corresponding filter support grooves of the filter trays 231–232. Leaf springs of the type shown at 291–292 (FIG. 4) are installed to hold the filters in place. Then, the lenses 11–17 of the OADM 10A are installed in the respective grooves 181–187 of the base member 121, and the equivalent lenses of the OADM 10B are installed in the respective grooves 191–197 of the base member 121. Each of these fourteen lenses is then fixedly secured in place within its groove with an appropriate known adhesive, but could alternatively be fixedly secured in place by a leaf spring of the type shown at 291–292 (FIG. 4). As explained above, the input fiber 21 and associated lens 11 of the OADM 10A are already secured together, as are the equivalent input fiber and lens of the OADM 10B. However, according to a feature of the invention, the six output fibers 22–27 of the OADM 10A are not yet coupled to their associated lenses 12–17, nor are the six output fibers of the OADM 10B coupled to their associated lenses. This permits the position of each output fiber to be accurately positioned with respect to the associated lens so as to obtain a desired result with respect to radiation received by the lens, as discussed in more detail below.

More specifically, with reference to FIG. 4 and the filter 31, lens 12 and fiber 22, it was mentioned above that the opposite side surfaces 281 and 282 (FIG. 8) of the filter 31 may not be parallel, and that the filter 31 may thus refract and redirect the beam of radiation passing through it to some small extent. The amount and direction of this refraction cannot be predicted in advance, because it varies from one filter part to the next. The curved left end of the lens 12 in FIG. 4 is designed to focus radiation toward the flat surface at the opposite end of the lens 12, in a manner so that the focal point is approximately located on the flat surface. Ideally, the filter 31 should direct radiation along the central axis of the lens 12, such that the lens will focus the radiation along the central axis of the lens 12, which extends through the very center of the flat surface at the right end of the lens 12. However, since the filter 31 is typically not ideal, it will usually tend to direct radiation at very small angle with respect to the central axis of the lens 12, which in turn will cause this radiation to impinge on the curved surface of the lens in a region slightly eccentric to the central axis of the lens 12, which in turn will cause the radiation to be focused within the lens 12 along some axis which intersects the flat surface of the lens at a location eccentric to the centerpoint of the flat surface. By attaching the fiber 22 to the lens 12 after the filters and lenses are all mounted in the apparatus 110, a desired effect can be achieved.

For example, in an application where it is desirable to maximize the amount of radiation entering the fiber 22, radiation can actually be introduced through the input fiber 21 and the lens 11, such that it passes through the filter 31 and the lens 12. The distal end of the output fiber 22 can then be monitored so as to measure the amount of radiation from the lens 12 which enters the proximal end of the fiber 22. The proximal end can then be moved relative to the flat surface of the lens 12, while continuing to measure the amount of radiation passing through fiber 22, until a determination is made of a relative position thereof in which the maximum amount of radiation enters the fiber 22. The proximal end of the fiber 22 can then be fixedly coupled to the lens 12 in that relative position, in a manner described later.

In a different application, it may be desirable to realize a predetermined insertion loss from the input fiber 21 to the output fiber 22. If the fiber 22 is positioned relative to the lens 12 so as to maximize the amount of radiation entering fiber 22 (in the manner just described), the resulting insertion loss might be less than the desired insertion loss. Therefore, in order to realize the desired insertion loss, the proximal end of the fiber 22 can be moved relative to the flat surface of the lens 12 while monitoring the amount of radiation entering the fiber 22, in a manner similar to that just described, but so as to locate a relative position in which the amount of radiation entering the end of fiber 22 is less than the maximum amount of available radiation, in order to achieve the desired insertion loss.

Figure 9:
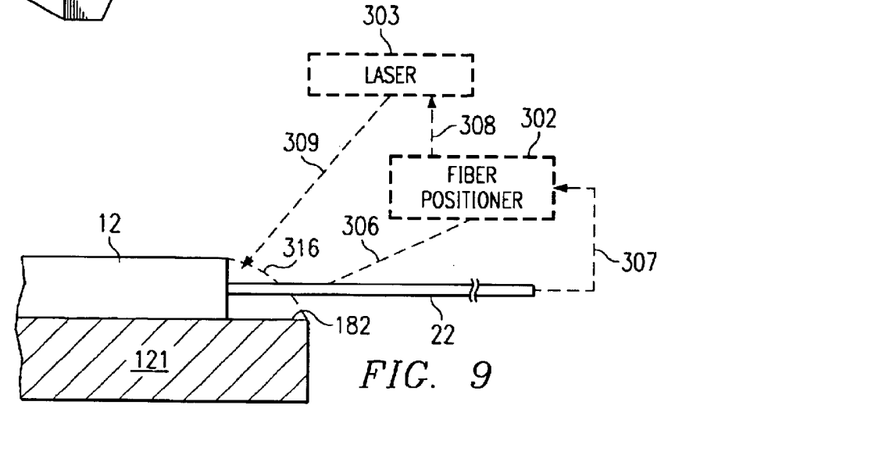
FIG. 9 is a diagrammatic view of a portion of the multiplexer apparatus of FIG. 3, together with a fiber positioner and a laser.

The manner in which the fiber 22 is secured to the lens 12 will now be described with reference to FIG. 9. FIG. 9 is a fragmentary diagrammatic sectional view of a portion of the OADM apparatus 110 in the region of collimating lens 12, and also diagrammatically shows a fiber positioner 302 and a laser 303. The lens 12 is shown fixedly secured within the groove 182 of member 121. The fiber positioner 302 is operatively coupled to the output fiber 22, as shown diagrammatically by a broken line 306. There are commercially available devices which are suitable for use as the fiber positioner 302, one example of which is a semi-automated fiber alignment system available under the tradename "ORION" from Newport Corporation of Irvine, Calif.

The fiber positioner 302 can monitor the amount of radiation passing through the fiber 22 to its distal end, as indicated diagrammatically by a broken line at 307, while the fiber positioner 302 physically moves the proximal end of the fiber 22 adjacent the flat end surface of the lens 12. This movement is linear movement in three orthogonal directions, including a first direction or axis which is vertical, a second direction or axis which is horizontal and substantially coaxial with the central axis of the lens 12, and a third direction or axis which is horizontal and perpendicular to the first and second axes. In general, once the proximal end of the fiber 22 has been moved along the second axis until it is adjacent the flat surface of the lens, virtually all of the subsequent positioning movement occurs along the first and third axes.

The fiber positioner 302 has the capability to position the fiber 22 according to a selected criteria. For example, the criteria may be to position the fiber 22 so that it receives the maximum amount of available radiation from the lens 12, which typically means that the end of the fiber would be positioned at the location where the flat surface of the lens is intersected by the line along which the curved surface is focusing the radiation. Alternatively, the fiber positioner 302 can position the end of fiber 22 so that a predetermined amount of radiation enters the fiber 22, even though this amount of radiation is less than the maximum amount of radiation available from the lens 12. Other criteria could also be used for determining where to position the end of the fiber 22.

When the fiber positioner 302 has positioned the fiber 22 so as to satisfy the selected criteria, the fiber positioner 302 enables the laser 303, as indicated diagrammatically at 308. The laser 303 then directs onto the end of the fiber 22 a laser beam which is indicated diagrammatically by a broken line 309, and which has the effect of fusing the end of the fiber 22 to the flat end surface of the lens 12, so as to fixedly fasten them together. There are commercially available devices which are suitable for use as the laser 303, one example of which is a laser available as model J48-1W from Synrad Inc. of Mukilteo, Wash. In the disclosed embodiment, fiber positioner 302 and laser 303 automatically carry out the positioning and fusing of the end of fiber 22 relative to the end surface of lens 12.

After the end of the fiber 22 has been fused to the lens 12, a small quantity of a known adhesive 316 is applied within the groove 182 against the flat end surface of the lens 12, so as to surround the associated end portion of the fiber 22. After this adhesive sets, it adds mechanical strength to the connection between the lens 12 and the fiber 22, and serves to reduce relative movement between them that might sever the laser-fused connection. The adhesive 316 does not affect the optical operation of the lens 12 and fiber 22.

Although the foregoing discussion of FIG. 9 is directed to the approach of fixing a fiber to a lens using a laser beam, with or without the subsequent application of an adhesive, there are alternative techniques which fall within the scope of the present invention. In this, regard, one possible alternative is to use an arc fusing technique instead of a laser beam, where two electrically conductive probes are placed on opposite sides of the fiber closely adjacent the lens, and then a substantial voltage is applied across the probes in order to generate an electrical arc that fuses the fiber to the lens. After arc fusing the fiber and lens together in this manner, an adhesive can be applied in the same manner as discussed above for applying the adhesive 316 after laser fusing of the fiber and lens. Still another alternative approach is to use a suitable adhesive to couple the fiber to the lens, without any fusing of the fiber to the lens.

With reference to the OADM 10A of FIG. 4, one possible configuration might involve a specification requiring that, except for the output fiber 27, each of the output fibers 22–26 have approximately the same insertion loss with respect to the input fiber 21. In that case, radiation at a constant level would be introduced through the input fiber 21 and its lens 11, and then the output fiber 26 would be positioned relative to the lens 16 and then coupled to the lens 16 so as to either maximize the amount of radiation entering fiber 26, or so as to realize a predetermined insertion loss for the fiber 26. Then the output fibers 22–25 would be positioned and fastened with respect to their associated lenses 12–15 in any suitable sequence, so that each of these output fibers 22–25 realized approximately the same insertion loss as that obtained for the output fiber 26.

The present invention has a number of technical advantages. One such technical advantage is that the invention can provide the precise alignment needed to meet insertion loss specifications in a manner which is cheaper and more efficient than preexisting techniques. In this regard, the approach according to the present invention is simple, repeatable and fast, and involves less manual labor than preexisting approaches. A related advantage is that insertion losses at respective different outputs can be easily and accurately set relative to each other so as to be the same.

Yet another advantage is that alignment of a fiber and lens is carried out using only orthogonal movement of the fiber along three axes, without any need to adjust the angle of the fiber with respect to the lens. Still another advantage is that fusion of the fiber and lens ensures that the connection between them will be unlikely to fail in the field. This is enhanced by the use of a quantity of an adhesive in combination with the fusion of the lens and fiber. A further advantage is that, although the present invention permits each lens to be secured in its V-groove with an adhesive, other techniques for securing the lens in place also become viable, such as use of a mechanical leaf spring.

Although one embodiment has been illustrated and described in detail, it will be understood that various substitutions and alterations can be made therein without departing from the spirit and scope of the present invention, as defined by the following claims.

What is claimed is:

1. An apparatus, comprising:

a first portion operable to support an optical filter and a lens each fixedly mounted thereon in respective predetermined operational positions;

a second portion operable to transmit radiation along an optical path so that a first portion of the radiation is reflected by the optical filter and a second portion of the radiation is transmitted through the filter, thereafter reaches and is optically influenced by said lens, and thereafter reaches an end portion of an optical fiber;

a third portion operable to adjust a position of said end portion of said optical fiber with respect to a surface of said lens while monitoring the amount of said second portion of the radiation from said optical path which enters said end portion of said optical fiber through said surface of said lens, until said end portion of said optical fiber is disposed in a selected position with respect to said surface of said lens; and a fourth portion operable to thereafter fixedly secure said end portion of said optical fiber to said surface of said lens with said end portion of said optical fiber in said selected position with respect to said surface of said lens.

2. An apparatus according to claim 1, wherein said fourth portion includes a laser which emits a laser beam that fuses said end portion of said optical fiber to said surface of said lens.

3. An apparatus according to claim 1, wherein said third portion is further operable to effect said adjusting by keeping said end portion of said optical fiber oriented to extend parallel to a selected direction throughout said movement of said end portion of said optical fiber relative to said lens.

4. An apparatus according to claim 1, wherein said third portion is further operable to effect said adjusting by moving said end portion of said optical fiber relative to said lens during said monitoring so as to identify a relative position thereof which is said selected position and in which the amount of the radiation entering said end portion of said optical fiber from said optical path satisfies a criteria.

5. An apparatus, comprising:

first means for supporting an optical filter and a lens each fixedly mounted thereon in respective predetermined operational positions;

second means for transmitting radiation along an optical path so that a first portion of the radiation is reflected by the optical filter and a second portion of the radiation is transmitted through the filter, thereafter reaches and is optically influenced by said lens, and thereafter reaches an end portion of an optical fiber;

third means for adjusting a position of said end portion of said optical fiber with respect to a surface of said lens while monitoring the amount of said second portion of the radiation from said optical path which enters said end portion of said optical fiber through said surface of said lens, until said end portion of said optical fiber is disposed in a selected position with respect to said surface of said lens; and fourth means for thereafter fixedly securing said end portion of said optical fiber to said surface of said lens with said end portion of said optical fiber in said selected position with respect to said surface of said lens.

6. An apparatus according to claim 5, wherein said fourth means includes a laser which emits a laser beam that fuses said end portion of said optical fiber to said surface of said lens.

7. An apparatus according to claim 5, wherein said third means includes means for effecting said adjusting by keeping said end portion of said optical fiber oriented to extend parallel to a selected direction throughout said movement of said end portion of said optical fiber relative to said lens.

8. An apparatus according to claim 5, wherein said third means includes means for effecting said adjusting by moving said end portion of said optical fiber relative to said lens during said monitoring so as to identify a relative position thereof which is said selected position and in which the amount of the radiation entering said end portion of said optical fiber from said optical path satisfies a criteria.

* * * * *

UNITED STATES PATENT AND TRADEMARK OFFICE
CERTIFICATE OF CORRECTION

PATENT NO. : 6,952,513 B2 Page 1 of 1
APPLICATION NO. : 10/636453
DATED : October 4, 2005
INVENTOR(S) : Muphy et al.

It is certified that error appears in the above-identified patent and that said Letters Patent is hereby corrected as shown below:

Column 5, Line 23, after "including but", insert -- not --.
Column 11, Line 39, after "In this", delete ",".

Signed and Sealed this

Twenty-sixth Day of December, 2006

JON W. DUDAS
*Director of the United States Patent and Trademark Office*